United States Patent [19]

Lapthorne

[11] Patent Number: 4,997,072
[45] Date of Patent: Mar. 5, 1991

[54] ROTATING CONCENTRIC SHAFT DISCONNECT ACTUATING MECHANISM FOR AN INTEGRATED DRIVE GENERATOR

[75] Inventor: Peter L. Lapthorne, Mount Waverley, Australia

[73] Assignee: Sundstrand Corporation, Rockford, Ill.

[21] Appl. No.: 396,494

[22] Filed: Aug. 21, 1989

[51] Int. Cl.$^5$ .................. F16D 11/00; F16D 13/58
[52] U.S. Cl. .................. 192/67 R; 192/101; 192/114 R
[58] Field of Search ........... 192/67 R, 114 R, 93 R, 192/24, 101

[56] References Cited

U.S. PATENT DOCUMENTS

| | | | |
|---|---|---|---|
| 2,001,292 | 5/1935 | Von Soden-Fraunhofen et al. | 192/93 R X |
| 2,855,768 | 10/1958 | Plano | 464/160 |
| 3,080,030 | 3/1963 | Troeger | 192/101 |
| 3,220,218 | 11/1965 | Rio et al. | 192/101 X |
| 3,298,249 | 1/1967 | Nott | 74/625 |
| 3,603,175 | 9/1971 | Horton | 74/625 |
| 4,042,088 | 8/1977 | Schmohe | 192/114 R |
| 4,086,991 | 5/1978 | Swadley | 192/82 T |
| 4,167,695 | 9/1979 | Phillips | 322/12 |
| 4,232,772 | 11/1980 | Brissey et al. | 192/114 R |
| 4,434,881 | 3/1984 | Denk et al. | 192/89 A |
| 4,684,000 | 8/1987 | Brown | 192/67 R |

Primary Examiner—Richard Lorence
Attorney, Agent, or Firm—David H. Hitt

[57] ABSTRACT

This invention relates to internal concentric shaft disconnect mechanism for use in an integrated drive generator of the type employed onboard aircraft for power generation. The integrated drive generator employs a concentric input shaft/output shaft arrangement wherein it is desired to disconnect the inner input shaft from the outer output shaft. Accordingly, this invention provides a releasable coupling slidably mounted on and drivingly connected to the output shaft for coupling the input shaft to the output shaft, the releasable coupling having a retaining pin. An annular cam is slidably mounted on the integrated drive generator frame radially outwardly of the output and input shafts and has inner ramped surfaces thereon for engaging the retaining pin, the retaining pin releasing the releasable coupling to thereby decouple the input shaft from the output shaft when the cam is activated by sliding movement to thereby provide shaft disconnect internally of the concentrically mounted input and output shafts.

18 Claims, 2 Drawing Sheets

ROTATING CONCENTRIC SHAFT DISCONNECT ACTUATING MECHANISM FOR AN INTEGRATED DRIVE GENERATOR

TECHNICAL FIELD

This invention relates to a rotating shaft disconnect actuating mechanism of the type used in an integrated drive generator ("IDG") power system onboard an aircraft to decouple an output shaft from a concentrically inward input shaft by remote control from the cockpit of the aircraft.

BACKGROUND ART

Rotating shaft disconnect systems, in the general sense, are not new. For years, different applications have demanded that an output shaft be disconnected from an input shaft in case of failure of a driven mechanism so that driving of the driven mechanism can be halted and so the driving mechanism may not be damaged. In a typical arrangement, an input shaft is provided having a clutched end. An output shaft is provided adjacent the input shaft having a slidable clutched end. The slidable clutched end is under some external control in order to allow the slidable clutched end to retract, thereby disengaging the output shaft from the input shaft. Prior art devices have employed various methods of disconnecting such axially aligned and non-concentric output shaft-input shaft arrangements. The present invention is the first, however, to be directed to providing a concentric shaft decoupling which replaces, with the fewest hardware modifications, a heat activated eutectic solder disconnect device. The present invention allows an IDG to be disconnected remotely, such as from an airplane cockpit whenever desired. Further, the present invention is the first specifically designed to operate within the narrow confines of an IDG.

Following is a discussion of some disconnect methods and the deficiencies thereof in a concentric shaft environment.

U.S. Pat. No. 4,086,991, which issued on May 2, 1978 to Swadley, and commonly assigned with the present invention, is directed to a thermally actuated disconnect coupling which includes a coupling shaft normally connected between a drive member and a driven member to transmit torque from the drive member to the driven member. Within the driven member, a fusible element such as an eutectic pellet supports the coupling shaft against axial movement during normal in-service use of the coupling. Providing the connection between the coupling shaft and the drive member are axially straight splines formed both on the coupling shaft and the drive member. At the other end of the coupling shaft, helical splines formed on the coupling shaft and the driven member provide means whereby torque is transmitted through the coupling shaft to the driven member. The axial length of the helical splines is greater than the axial length of the straight splines. When the pellet has melted, such as by overheating, an axially directed component transmitted by the helical splines propels the coupling shaft away from the drive member thereby disconnecting the drive and driven members. Swadley describes a thermal disconnect mechanism for an IDG which is not operable by an aircraft crew. As such, Swadley is useful when a purely thermal disconnect is sought. However, the present invention is directed to a different purpose: provision of a device remotely controllable which allows disconnect at a pilot's discretion and is therefore useful in a variety of malfunction conditions. Some of the malfunction conditions may not involve IDG overheating and therefore may not trigger the Swadley device.

U.S. Pat. No. 4,434,881, which issued on Mar. 6, 1984 to Denk et al., is directed to a disconnect member which is spline-connected to one end of a connecting drive shaft of an engine and a driven accessory, and is axially translatable into and out of coupling engagement with the engine. The disconnect member has a spiralled, axially ramped cam surface formed thereon which cooperates with a rotatable cam follower selectively movable into engagement therewith to axially drive the rotating disconnect member relative to the cam follower, thereby uncoupling the engine from its driven accessory. When the cam followers disengage from the cam surface, a reset spring automatically recouples the disconnect member to the engine. Denk et al. uses a rotating cam to withdraw a spline shaft from engagement. Denk et al. is not designed to retract a radially outward output shaft from a concentrically inward input shaft. Further, Denk et al. is not designed to replace an existing heat activated concentric shaft disconnect. Finally, Denk et al. is inappropriate for use within the tight confines of an IDG, where a shaft disconnect must be shaped to be appropriately received within the space allotted. The instant invention uses a stationary cam for the purpose of retracting a retaining pin and not for directly withdrawing the spline shaft.

U.S. Pat. No. 4,167,695, which issued on Sept. 11, 1979 to Phillips, is directed to a system intended primarily for use in multi-engined aircraft. A kit for each engine includes a generator drive train connected to an engine to be driven thereby, a driving formation for connection to a generator, and a coupling or clutch in the drive train to decouple a generator in case of mechanical or electrical failure. Signal means may be located in the cockpit in the pilot's field of view to indicate generator failure. A switch operable by the pilot in response to the failure signal acts to remotely cause decoupling of the generator. The switch also operates means to deactivate any other decoupling switch to prevent mistakenly decoupling a properly functioning generator. Cross-connection switch means are connected to all engines and generators and may be actuated to electrically connect an active generator to the engine having the decoupled generator. The coupling or clutch uses a retaining latch internal to the shaft which is disengaged by axial movement of driving plunger under solenoid actuation to allow separation of dogteeth. Apart from the use of dogteeth, Phillips differs, both in structure and operation from the instant invention and is inappropriate for use with concentric shafts and within the narrow confines of an IDG.

U.S. Pat. No. 4,232,772, which issued on Nov. 11, 1980 to Brissey et al., is directed to a disconnect arrangement for high-speed aircraft generators and includes a disconnectable rigid, torque transmitting spring loaded curvic gears coupled between the driving and driven shafts. A plurality of flexible supported sear members mounted on the driven shaft engage the movable member of the curvic gears. The sears have tapered faces which engage correspondingly tapered shoulders on the movable curvic gear member. The sears are latched to hold the curvic gear members in contact by the armature of an electromagnet. The armature normally rides over the top of the gears maintaining them in contact with the tapered shoulder of the curvic gear member. When the electromagnetic armature is actuated to disengage the driving and driven shafts, the armature moves axially. This removes a retaining force from the tapered sears, allowing them to flex outwardly. The natural separating force of the spring loaded curvic gear causes the sear to ride upwardly on the tapered surface of the curvic shoulder until the sears and the shoulder disengage. This allows the spring loaded gears to separate terminating transmission of torque from the driving to the driven shaft. Brissey et al, therefore, uses spring loaded sears held in place by an electromagnetically moved armature. The sears are held in place mechanically. In the instant invention, the pins are lightly held by springs and mainly held by centrifugal force. In Brissey et al, the sears are moved outward by spring force. In the instant invention, the pins are driven in against spring force by a cam. Brissey et al. is not appropriate to replace a heat activated eutectic shaft disconnect mechanism as found in an IDG.

U.S. Pat. No. 3,603,175 which issued on Sept. 7, 1971 to Horton, is directed to an actuator having a clutch control mechanism arranged to set the actuator in a position in which it is driven by a motor via a worm wheel or in a manually driven position. The clutch control mechanism includes a yoke which is manually moved by a lever to urge the clutch member into the manual drive position. The yoke is locked in this position by a latch which bears against a rod attached to the yoke. In this position, the latch also bears against the worm wheel and is rotated when the latter is motor driven. Rotation of the latch allows the rod to drop into a hole in the latch and the clutch member moves into engagement with the worm wheel. Rotation of the worm wheel therefore automatically changes the actuator from manual drive to motor drive. Horton, therefore, uses a cam to drive a yoke which drives a dog clutch in and out of engagement. In Horton, the cam is actuated by a hand lever. In the instant invention, however, the cam action is derived from rotation of the shaft which is being disconnected. In other words, the shaft in the instant invention provides the rotation which causes pin actuation by the cam.

U.S. Pat. No. 3,080,030, which issued on Mar. 5, 1963 to Troeger, is directed to a high-speed torque transmission means with an emergency disconnect coupling or device for connecting and uncoupling a powered drive shaft and a driven shaft in an aircraft. Troeger uses an axial movement of a wedge to lock a second wedge in place which thereby retains disconnect teeth in engagement. In Troeger, therefore, actuation means are driven axially. In the instant invention, however, actuation means are primarily rotational; in particular, cam action is rotational. Troeger is inappropriate for disconnect of concentric shafts in an IDG.

U.S. Pat. No. 2,855,768, which issued on Oct. 14, 1958 to Plano, is directed to a latched release positive clutch which can be used between a motor and a driven device such as a generator. Apparently, Plano uses a retaining pin to hold the clutch in engagement. Retracting the pin causes spring force disengagement. Plano does not address actuation of the pin. In the instant invention, it is critical due to (A) the narrow confines of an IDG, (B) the configuration of the replaced thermal disconnect and (C) the arrangement of an annular cam that the pin be actuated in the manner shown.

U.S. Pat. No. 3,298,249, which issued on Jan. 17, 1967 to Nott, is directed to an actuating mechanism for valves of the kind incorporating a drive mechanism by which the valve may be selectively operated either manually or by power means such as an electric motor. Nott uses axial movement of a cam to dislodge a retaining pin. In Nott, the cam movement is reversible by actuation of a hand wheel or by the axial motion of the driven gear. Disconnect actuation is axial in Nott. In the instant invention, disconnect actuation is rotary.

None of the aforementioned inventions was designed to overcome the problem presented when an output shaft concentric with an input shaft is to be decoupled. Furthermore, these inventions were never designed to fit within the narrow confines of an IDG, where space is at a premium. Finally, none of these inventions was designed to replace a simple eutectic solder pin without major modifications to the IDG. Applicant's invention is the first to address the problem of providing a shaft disconnect for concentric shafts and is the first to do so while working within the narrow confines of an IDG and while requiring minimal modifications to an existing eutectic solder disconnect design.

DISCLOSURE OF INVENTION

It is therefore a primary object of this invention to provide an internal concentric shaft disconnect mechanism which is designed for disconnecting the inner of two concentric shafts from the outer.

Another primary object of this invention is to provide an internal concentric shaft disconnect mechanism which replaces, with the least modification, and existing eutectic solder disconnect mechanism.

Yet another primary object of this invention is to provide an internal concentric shaft disconnect mechanism which is designed to function within the narrow confines of an IDG.

Another object of the invention is to provide an internal concentric shaft disconnect mechanism having a releasable coupling slidably mounted on and drivingly connected to an output shaft for coupling an input shaft to the output shaft, the releasable coupling means having a release mechanism.

Still another object of the invention is to provide an internal concentric shaft disconnect mechanism which has a cam slidably mounted on a frame radially outwardly of output and input shafts and having a surface thereon for engaging a release mounted on the output shaft, the release releasing a releasable coupling mounted on the output shaft to thereby decouple the input shaft from the output shaft when the cam is activated by sliding movement to thereby provide shaft disconnect internally of the concentrically mounted input and output shafts.

A still further object of the invention is to provide an internal concentric shaft disconnect mechanism wherein an input shaft has an engaging end.

Yet a further object to the invention is to provide an internal concentric shaft disconnect mechanism wherein an output shaft is located radially outward of and proximate an engaging end of an input shaft.

Yet another object of the invention is to provide an internal concentric shaft disconnect mechanism wherein a releasable coupling is adapted for engaging an engaging end of an input shaft.

Another object of the invention is to provide an internal concentric shaft disconnect mechanism wherein a cam is annular and is concentric with output and input shafts.

Still another object of the invention is to provide an internal concentric shaft disconnect mechanism wherein a cam comprises a plurality of ramped surfaces on its interior diameter, the ramped surfaces engaging a release mounted on an output shaft, causing the release to move radially inward, releasing a coupling mounted on the output shaft.

A final object of the invention is to provide an internal concentric shaft disconnect mechanism wherein a cam is activated by means of a solenoid.

In the attainment of the foregoing objects, the apparatus that encompasses the preferred embodiment of the invention includes a frame. The frame has an input shaft mounted for rotation with respect to the frame. An output shaft is mounted for rotation with respect to the frame and is concentric with the input shaft. An engaging collar is slidably mounted on and drivingly connected to the output shaft for engaging the input shaft when the engaging collar is in an extended position with respect to the output shaft. A first spring urges the engaging collar to a retracted position wherein the output shaft is disengaged from the input shaft. A retainer, in the form of a pin is mounted on the output shaft and is radially slidable with respect to the input shaft for keeping the engaging collar in the extended position. An annular cam is slidably mounted on the frame concentric with the output shaft and has an inner surface for engaging the retainer when the annular cam is in an actuation position whereby the retainer is displaced radially inward. A second spring urges the annular cam toward the actuation position. An actuation pin passes through a bore in the frame and engages a bore in the annular cam to prevent the annular cam from assuming the actuation position. The actuation pin is slidably movable radially with respect to the annular cam, the annular cam assuming the actuation position when the actuation pin is slid radially outward. The actuation pin is slid radially outward by means of a solenoid under remote control.

The input shaft has an engaging end. The output shaft is located radially outwardly of the input shaft and is proximate the engaging end. The engaging collar is adapted to engage the engaging end. The annular cam is located concentrically outwardly of the output shaft and the input shaft and has a plurality of ramped surfaces on its inner diameter, the ramped surfaces engaging the retainer.

Other objects and advantages of the present invention will be apparent upon reference to the accompanying description when taken in conjunction with the following drawings:

BEST MODE FOR CARRYING OUT INVENTION

Figure 1:
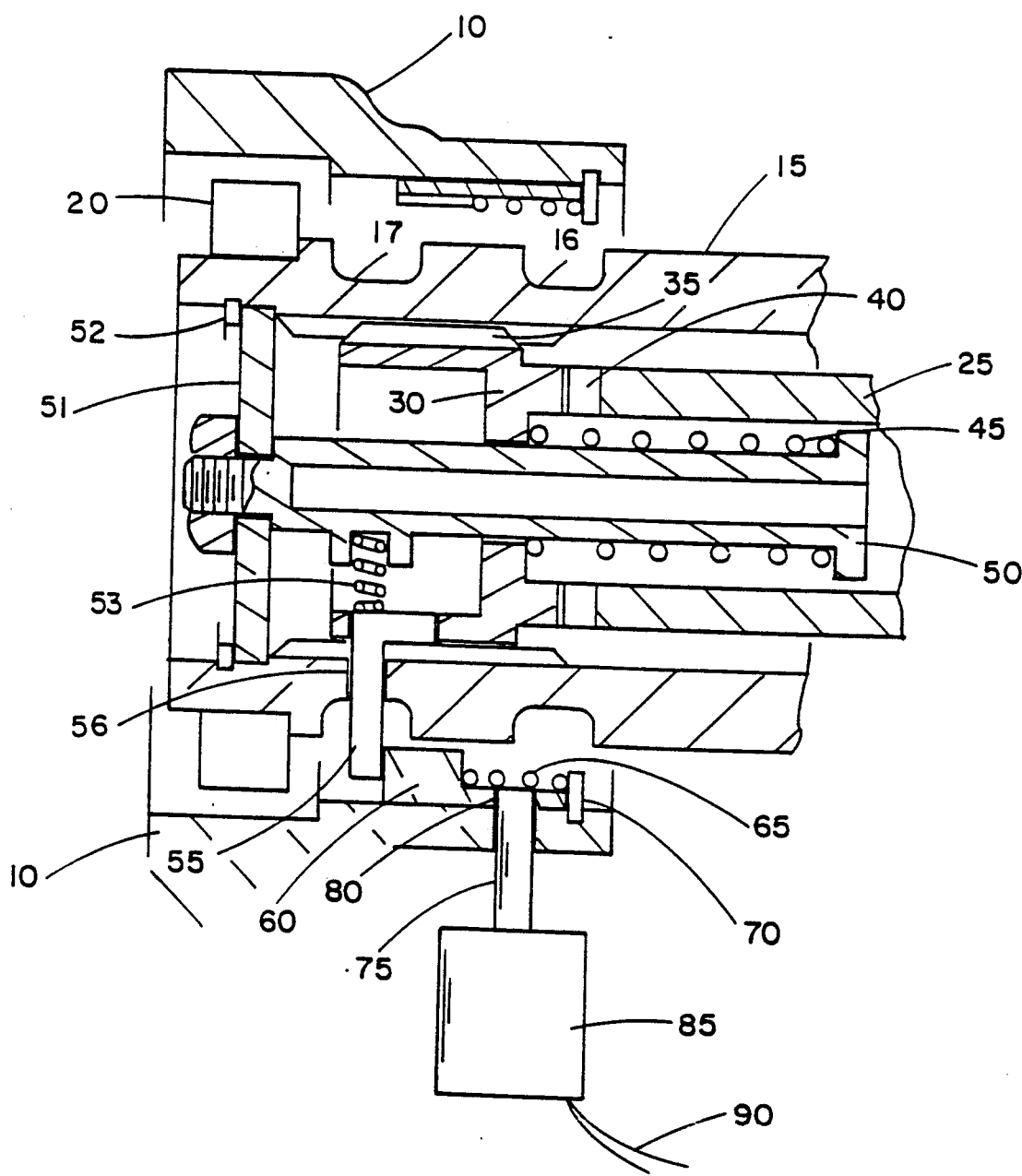
FIG. 1 is a full section view of an internal concentric shaft disconnect mechanism embodying the invention.

FIG. 1 is a full section view of the internal concentric shaft disconnect mechanism. A frame 10 is stationary and contains the internal concentric shaft disconnect mechanism of the present invention. An output shaft 15 is mounted for rotation within the frame 10 by a bearing 20 and other bearings (not shown). The output shaft 15 includes a first shear section 16 and a second shear section 17. An input shaft 25 is mounted for rotation within the output shaft 15 by bearings (not shown). A releasable coupling or engaging collar 30 is slidably mounted with respect to the output shaft 15 by a sliding spline 35 which allows the engaging collar 30 to move axially with respect to the output shaft 15. However, any rotation of the engaging collar 30 is transferred, without slippage, through the sliding spline 35 into the output shaft 15. The engaging collar 30 is coupled to the input shaft 25 by means of a dog clutch 40 having a positive rake in the teeth of the dog clutch 40 in the preferred embodiment to urge separation of the engaging collar 30 from the input shaft 25.

The engaging collar 30 is shown in an extended position with respect to the output shaft 15 wherein the engaging collar 30 is coupled to the input shaft 25 via the dog clutch 40. The engaging collar 30 also has a retracted position (not shown) wherein the engaging collar 30 is decoupled from the input shaft 25 by separation of the dog clutch 40. A first spring 45 is under compression and thereby urges the engaging collar 30 to its retracted position. The first spring 45 is placed under compression by bearing against an output shaft extension 50 situated radially inward of the input shaft 25 which, by means of an output shaft connection 51 and an output shaft stop 52 is coupled to the output shaft 15. The output shaft connection 51 is an annulus fixedly coupled to an inner diameter of the output shaft 15 by the output shaft stop 52 having a hole (not referenced) in its center. The output shaft connection 51 rotates with the output shaft 15 and provides a fixed support for the output shaft extension 50, which is bolted to the output shaft connection 51 by a bolt (shown but not referenced). A release or retaining pin 55 engages the engaging collar 30 to prevent the first spring 45 or the positive rake of the dog clutch 40 teeth from urging the engaging collar 30 to its retracted position. The retaining pin 55 passes through a retaining pin bore 56 in the output shaft 15 and is held in a radially outward position by a retaining pin spring 53 bearing radially against the output shaft extension 50.

An annular cam 60 is provided concentrically outwardly of the output shaft 15 and the input shaft 25. The annular cam 60 has a plurality of ramped inner surfaces (not shown in FIG. 1) which are designed to engage the retaining pin 55 when the annular cam 60 is actuated. The annular cam 60 is shown in a retracted position. A second spring 65 is placed in compression between the annular cam 60 and a cam stop 70 to urge the annular cam 60 into its actuation position, whereby its ramped inner surfaces (not shown) engage the retaining pin 55. In its actuation position, one of the ramped inner surfaces (not shown) of the annular cam 60 comes into contact with the retaining pin 55, urging the retaining pin 55 radially inwardly against the bias of retaining pin spring 53. The retaining pin 55 moves radially inwardly a sufficient distance to disengage from the engaging collar 30, allowing the bias due to the compression of the first spring 45 and the positive rake of the dog clutch 40 teeth to urge the engaging collar 30 into its retracted position, decoupling the output shaft 15 from the input shaft 25. The annular cam 60 is allowed to slide only axially with respect to the frame 10 by means of a key and slot arrangement with the frame 10 (not shown in FIG. 1). The annular cam 60 is provided with an actuation pin bore 80 which is adapted to receive an actuation pin 75. When the actuation pin 75 engages the actuation pin bore 80, the annular cam 60 is prevented from assuming its actuation position. The actuation pin 75 is under control of a solenoid 85. The solenoid 85 is a standard electromechanical device which responds to electrical currents supplied by solenoid leads 90, under remote control.

When the solenoid leads 90 are provided with sufficient current to activate the solenoid 85, the solenoid 85 retracts the actuation pin 75 radially outward. Radially outward retraction of the actuation pin 75 causes disengagement of the actuation pin 75 from the actuation pin bore 80, permitting the second spring 65 to urge the annular cam 60 into its actuation position (to the left, as oriented in FIG. 1). In its actuation position, the inner cam surfaces (not shown in FIG. 1) are brought into contact with the retaining pin 55, urging the retaining pin 55 radially inwardly to release the engaging collar 30 from its driving relationship with the input shaft 25 via the dog clutch 40. Thereby, the output shaft 15 is disengaged from the input shaft 25.

Figure 2:
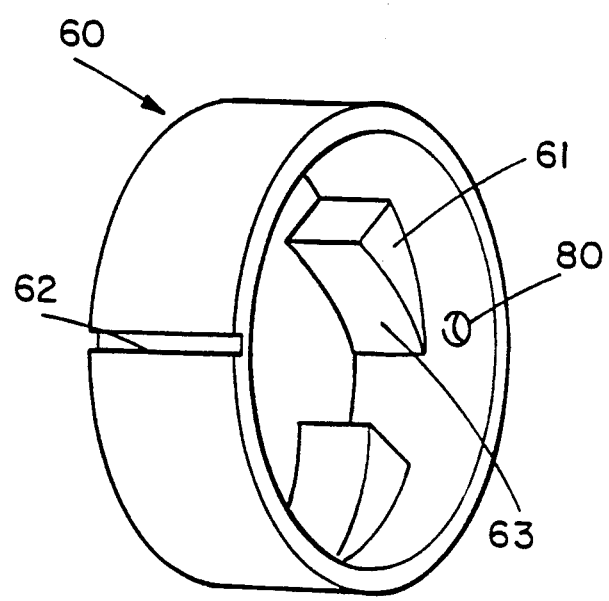
FIG. 2 is an isometric view of an annular cam shown in FIG. 1.

FIG. 2 shows an isometric view of the annular cam 60 of FIG. 1. The annular cam 60 is provided with a plurality of ramps 61 on its inner diameter. The annular cam 60 is further provided with an anti-rotation slot 62 which mates with an anti-rotation key (not shown) on the frame (not shown in FIG. 2, but shown in FIG. 1 as 10) to prevent rotation of the annular cam 60. The plurality of ramps 61 has corresponding inner cam surfaces 63, which are adapted to engage the retaining pin (not shown in FIG. 2, but shown in FIG. 1 as 55) to urge the retaining pin radially inward. Note that the inner cam surfaces 63 are biased such that the output shaft/input shaft arrangement must travel in one direction in order for the retaining pin to properly engage and ride up the inner cam surface 63.

An actuation pin bore 80 is provided to receive the actuation pin (not shown in FIG. 2, but shown in FIG. 1 as 75). Therefore, the actuation pin bore 80 prevents axial movement of the annular cam 60 with respect to the frame (not shown).

The materials and parts from which the instant invention are made are commonly known to those skilled in the art.

From the foregoing description it is apparent that the invention described provides a novel remote control internal concentric shaft disconnect mechanism for decoupling an output shaft from an input shaft when the shafts are concentric with respect to one another, the mechanism operating within the confines of an IDG and under the requirement that the mechanism require the fewest modifications to replace a heat activated eutectic solder decoupling mechanism.

Although this invention has been illustrated and described in connection with the particular embodiments illustrated, it will be apparent to those skilled in the art that various changes may be made therein without departing from the spirit of the invention that has set forth in the appended claims.

I claim:

1. An internal concentric shaft disconnect mechanism, comprising:
    a frame;
    an input shaft mounted for rotation with respect to said frame;
    an output shaft mounted for rotation with respect to said frame, said output shaft concentrically located with respect to said input shaft;
    a releasable coupling slideably mounted on and drivingly connected to said output shaft for coupling said input shaft to said output shaft, said releasable coupling having a release including a radially movable pin which maintains said releasable coupling in a position so as to drivingly connect said output shaft to said input shaft; and
    an annular cam slideably mounted on said frame radially outwardly of and concentric with said output and input shafts and having an inner surface thereon for engaging said release and urging said release radially inwardly, said release releasing said releasable coupling to thereby decouple said input shaft from said output shaft when said annular cam is activated by sliding movement to thereby provide shaft disconnect internally of said concentrically mounted input and output shafts.

2. The internal concentric shaft disconnect mechanism as recited in claim 1 wherein said input shaft has an engaging end.

3. The internal concentric shaft disconnect mechanism as recited in claim 2 wherein said output shaft is located radially outward of and proximate said engaging end.

4. The internal concentric shaft disconnect mechanism as recited in claim 3 wherein said releasable coupling is adapted for engaging said engaging end.

5. The internal concentric shaft disconnect mechanism as recited in claim 4 wherein said annular cam has a plurality of ramped surfaces on its inner surface, said ramped surfaces adapted to engage said release, engagement causing said release to move radially inward, releasing said releasable coupling.

6. The internal concentric shaft disconnect mechanism as recited in claim 5 wherein said cam is released for activation by means of a solenoid.

7. A concentric shaft decoupler having in combination a releasable coupling means within and between a concentrically disposed input and output shaft arrangement mounted in a housing having a releasable axially biased and moveable cam means, said releasable coupling means including a radially moveable pin means that maintains in an engaging position an axially moveable clutch means that connects for joint rotation said input shaft to said output shaft via said clutch means,
    said radially moveable pin means cooperating with said axially biased moveable cam means to cause radial movement of said pin to thereby free said axially moveable clutch for axial movement to thereby disengage said input shaft from said clutch means and free said output shaft for rotation with said input shaft whenever said moveable cam means is released to be biasedly moved in axial direction toward said pin means.

8. The concentric shaft decoupler as recited in claim 7 wherein said moveable cam means is concentrically disposed adjacent and around said input/output concentric shaft arrangement.

9. The concentric shaft decoupler as recited in claim 8 wherein said input shaft is disposed radially inwardly of said output shaft and said output shaft is mounted for rotation in said housing.

10. The concentric shaft decoupler as recited in claim 9 wherein said axially moveable clutch means is supported for axial movement relative to and for rotation with said output shaft.

11. The concentric shaft decoupler as recited in claim 10 wherein there is provided a biasing means positioned radially inwardly of said radially moveable pin to bias said pin in a radially outward direction towards said output shaft and into an axial path of said axially biased and moveable cam means.

12. An internal concentric shaft disconnect mechanism comprising:
 a frame;
 an input shaft mounted for rotation with respect to said frame;
 an output shaft mounted for rotation with respect to said frame, said output shaft concentric with said input shaft;
 engaging means slideably mounted on and drivingly connected to said output shaft for engaging said input shaft when said engaging means is in an extended position with respect to said output shaft;
 first spring means urging said engaging means to a retracted position wherein said output shaft is disengaged from said input shaft;
 retaining means mounted on said output shaft and radially slideable with respect to said input shaft for keeping said engaging means in said extended position;
 annular cam means slideably mounted on said frame concentric with said output shaft and having an inner surface for engaging said retaining means when said annular cam means is in an actuation position whereby said retaining means is displaced radially inward;
 second spring means urging said annular cam means toward said actuation position; and
 an actuation pin passing through a bore in said frame and engaging a bore in said annular cam means to prevent said annular cam means from assuming said actuation position, said actuation pin slideably moveable radially with respect to said annular cam means, said annular cam means assuming said actuation position when said actuation pin is slid radially outward.

13. The internal concentric shaft disconnect mechanism as recited in claim 12 wherein said input shaft has an engaging end.

14. The internal concentric shaft disconnect mechanism as recited in claim 13 wherein said output shaft is located radially outwardly of said input shaft.

15. The internal concentric shaft disconnect mechanism as recited in claim 14 wherein said output shaft is proximate said engaging end.

16. The internal concentric shaft disconnect mechanism as recited in claim 15 wherein said engaging means is adapted to engage said engaging end.

17. The internal concentric shaft disconnect mechanism as recited in claim 16 wherein said annular cam means is located concentrically outwardly of said output shaft and said input shaft.

18. The internal concentric shaft disconnect mechanisms as recited in claim 17 wherein said annular cam means has a plurality of ramped surfaces on its inner diameter, said ramped surfaces engaging said retaining means.

* * * * *